United States Patent

Yang, Jr.

[11] Patent Number: 5,999,336
[45] Date of Patent: Dec. 7, 1999

[54] FRESNEL MAGNIFYING LENS CARDHOLDER

[76] Inventor: Peter S. Yang, Jr., 379 Canal Rd., S. Bound Brook, N.J. 08880

[21] Appl. No.: 09/090,704

[22] Filed: Jun. 4, 1998

[51] Int. Cl.[6] .............................. G02B 3/08; G02B 27/02; G02B 7/02
[52] U.S. Cl. .......................... 359/742; 359/802; 359/808
[58] Field of Search .................................... 359/738, 742, 359/741, 796, 802, 803, 804, 798, 808

[56] References Cited

U.S. PATENT DOCUMENTS

| | | | |
|---|---|---|---|
| 3,140,883 | 7/1964 | Anthony | 281/34 |
| 3,409,347 | 11/1968 | Vogel | 359/808 |
| 3,797,917 | 3/1974 | Barbour | 359/742 |
| 4,044,899 | 8/1977 | Orentreich et al. | 414/517 |
| 4,805,680 | 2/1989 | Ueno | 150/147 |
| 5,412,199 | 5/1995 | Finkelstein et al. | 235/487 |
| 5,434,405 | 7/1995 | Finkelstein et al. | 235/487 |
| 5,471,347 | 11/1995 | Galiani | 359/807 |

Primary Examiner—Georgia Epps
Assistant Examiner—Suzanne Letendre
Attorney, Agent, or Firm—Antonelli, Terry, Stout & Kraus, LLP

[57] ABSTRACT

Disclosed is a fresnel magnifying lens card holder dimensioned to fit standardized cards, for example, all credit card sized cards. The card holder features a pair of parallel tracks, for example, J-shaped tracks which face each other, and a raised narrow strip on a base plate thereby facilitating the slipping on and off all such cards and, at the same time, using the cards themselves as a carrier, as a storage place and as a delivering vehicle of the fresnel lens. That is, the holder can take advantage of the popularity of the standardized cards, using them as its carriers in delivering a fresnel magnifying lens and a data stripe shield to the credit card users. Since keeping the data stripe from damage and helping to see small print clearly make the card friendlier to the user, providing these benefits could be of significant importance to both the card using public and to those who are marketing products and services.

20 Claims, 2 Drawing Sheets

FRESNEL MAGNIFYING LENS CARDHOLDER

BACKGROUND OF THE INVENTION

1. Field of the Invention

This invention relates to a fresnel magnifying lens, specifically a fresnel magnifying lens card holder that holds and releases a credit card sized card (hereinafter may be interchangeably called a standardized card).

2. Description of the Prior Art

The fresnel lens has been incorporated into various objects as a magnifier and visual aid. In U.S. Pat. No. 5,412,199, entitled "Credit Card With Magnifying Lens", and U.S. Pat. No. 5,434,405, entitled "Credit Card With A Fresnel Magnifying Lens Formed By A Section Of The Transparent Core", both issued in 1995, Finkelstein, et al. have shown how a fresnel magnifier could be incorporated into a machine readable, financial card. This card is capable of accommodating the encoded data and graphics as required by the financial institutions. The fresnel magnifying window serves as a visual aid to help its users to check the accuracy of the printed receipts at point of sale.

There are other known/conventional schemes involving a fresnel magnifier. In U.S. Pat. No. 4,044,889, issued Aug. 30, 1977, Orentreich, et al. incorporated a fresnel magnifier into a part of a lipstick cap and a cosmetic container top to magnify the small print on a separate part of the container. In 1974, Roberto Barbour was granted U.S. Pat. No. 3,797,917 for a box and viewer assembly that holds and views slides with a fresnel magnifier. Ralph L. Anthony, in 1964, was granted U.S. Pat. No. 3,140,883 for a book cover with a fresnel magnifier. Moreover, in 1968, Rudolf Vogel was granted U.S. Pat. No. 3,409,347 for a pocket fresnel magnifier in a transparent case with an opaque liner for accepting advertising messages.

OBJECTS OF THE INVENTION

Finkelstein, et al. disclosed a financial card which has a built-in window, in which the fresnel lens becomes an integral part of the card. In contrast, the present invention is not a card and the fresnel lens of the invention is not an integral part of any card. This invention is about a completely different object, involving a magnifying lens and card holder. Consequently, those requirements that restrict and regulate the position and size of the lens, data and graphics in laying out one's financial card are completely irrelevant to the present invention. The present invention allows piggy backing the magnifying lens onto a card which offers a greater convenience to its users with a larger magnifying window for viewing. In this connection, the invention features a fresnel magnifying lens card holder that holds a standardized card. The holder can piggy back onto any standardized card, including, for example, a pocket-size or wallet-size card, such as a credit card, using it as a carrier in delivering a fresnel magnifier to the card user.

The magnifying lens card holder of the present invention is completely detachable from the card to which it is attached. The lens is not on the card; therefore, it cannot interfere with the built-in functions of any card or be incompatible with its encoded data, graphics, usages or even features on a smart card of the future. In addition, this detachable magnifier can be used to see the graphics printed on the card itself. These advantages are made possible only by keeping the magnifier and the card as entirely separate entities and not as inseparable parts of each other. These advantages become even more evident when considering a physical condition like presbyopia. Presbyopia is a condition which universally affects the ability of the forty-plus person to see small print clearly. Access to a visual aid, at the moment when it is needed, could be of significant importance and interest to everyone who has this condition as well as to those who are marketing products and services.

This magnifying lens card holder takes advantage of the standardized dimensions of, for example, credit card sized cards. By means of a pair of parallel tracks and a raised strip on a base plate, it can slip on and off all such cards and use them as a carrier, as a storage place and as a delivering vehicle to provide an accessible and useful tool to the card users. The selection of common standardized cards as carriers for the holder's magnifier is both deliberate and practical. There are no other marketing objects, it is believed, more used or carried by more people than are such standardized cards. Using them as a carrier and as a delivering vehicle is quite an efficient means if not the most efficient means of reaching people. In addition, they provide a convenient location for the public to reach for a magnifier when it is needed and a place to park (i.e., store or put-away) the magnifier when it is not needed. Since these cards are usually kept in a pocket or in a compartment of a wallet or purse, having essentially the same dimensions as the cards allows the magnifier to be stored with the cards. This piggy back approach is particularly effective in helping to reduce the risks of forgetting to bring it along or of it being left behind.

Piggy backing a magnifier onto common and popular standardized cards by means of parallel tracks and a raised narrow strip on a base plate, and using them as a carrier, parking place and delivering vehicle are featured aspects of the present invention which invention, also, could not have been realized from the teachings of the above-discussed U.S. patents. Furthermore, this fresnel magnifying lens card holder is both physically and conceptually different from all previous inventions; therefore, it is novel, unobvious and patentable. Piggy backing onto a card could also create many synergistic relationships, providing a "user friendliness" for the card that could directly benefit the users and indirectly help the institution who are marketing products or services. For example, this magnifier will make the smallest print of a pocket calendar clearer and the instructions of a telecard easier to follow, thus making those objects more useful and user friendly to the card users, as well as more effective and valuable to the businesses that depend on them as marketing tools. Symbiotically, the magnifying lens card holder also shields and protects the card's data stripe from physical damage and its magnifier benefits from the accessibility to the users provided by these cards.

SUMMARY OF THE INVENTION

A fresnel magnifying lens card holder is disclosed featuring a pair of parallel grooved tracks and a raised strip on a base plate for all standardized cards, designed specifically to be piggy backed onto the cards, that is, using them as a carrier of the holder to deliver and thereby make accessible a fresnel magnifier and, at the same time, shield a data stripe on the card from the card holder surface. The accessibility of a magnifier and the added data stripe protection provided by the holder are beneficial to men and women who hold these cards; hence, it is also important to businesses who are marketing a product or service.

BRIEF DESCRIPTION OF THE DRAWINGS

The above set forth and other featured aspects of the invention are made more apparent in the ensuing detailed description of the invention when read in conjunction with the related examples described and illustrated in the accompanying drawings, wherein.

DESCRIPTION OF THE PREFERRED EMBODIMENT

Figure 1:
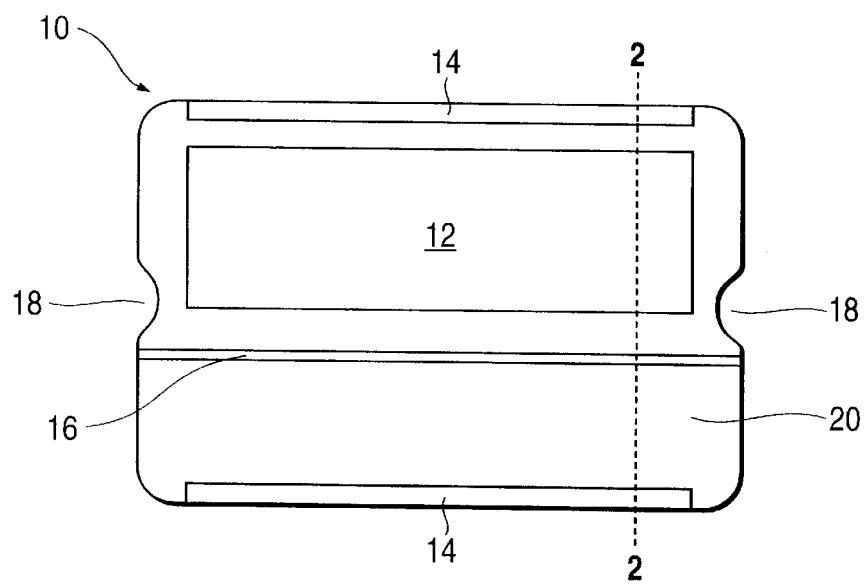
FIG. 1 is a top front view of the fresnel magnifying lens card holder according to one embodiment of the present invention.

A fresnel magnifying lens card holder (10) that can hold a standardized card (22) features a fresnel lens (12), on a base plate (20) whose dimension is essentially that of the card it holds. There are two parallel grooved tracks (14) which are J-shaped, in this example, facing each other and running along opposite edges of this base plate so a card can slide in or out and be held in its tracks. A raised narrow strip (16) is disposed on the base plate running parallel to the grooved tracks to compensate for the thickness of the card, thus providing the tension needed to hold the card snugly in the grooved tracks. This raised strip also keeps the data stripe (on the card) away from the base plate thereby preventing the data stripe from being damaged. Two semi-circular cutaways (18) on the remaining edges of the base plate are provided to facilitate the removal of the nested card by providing more surface for the fingers to grab and pull out the card, in either direction. To piggy back onto a card, one merely slips the holder onto a card and holds the card in its tracks. To use the magnifier, one simply slides the card out; the magnifying holder can be returned to the card for storage, afterwards.

Figure 2:
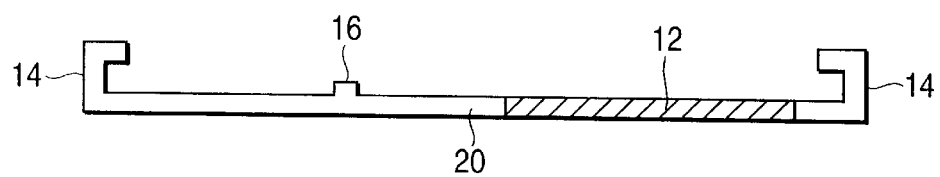
FIG. 2 is an enlarged, cross-sectional view of the holder at sectional line C-C' of FIG. 1.
Figure 3:
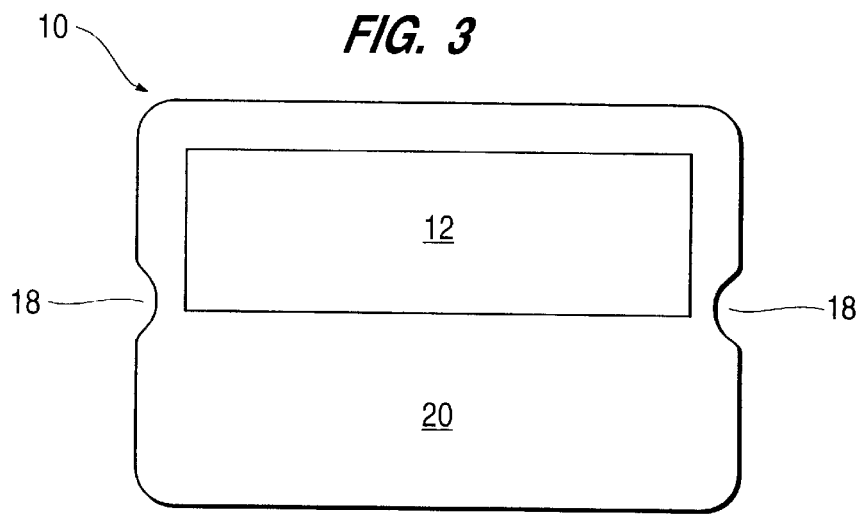
FIG. 3 is a rear view of the holder according to the example in FIG. 1.
Figure 4:
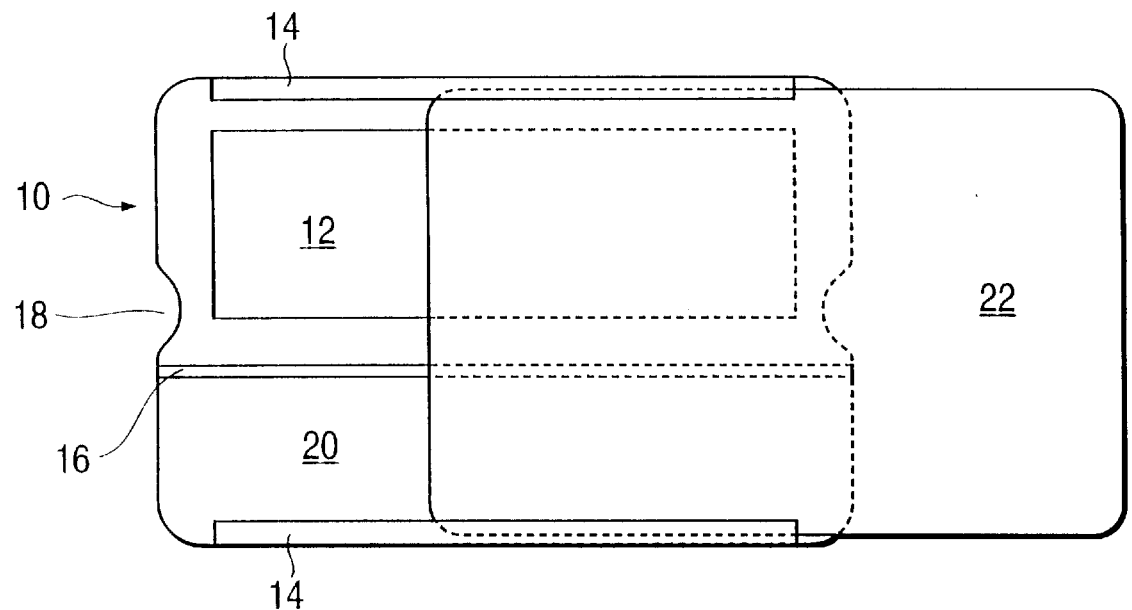
FIG. 4 is a top view of a standardized card sliding into the holder according to the example in FIG. 1.
Figure 5:
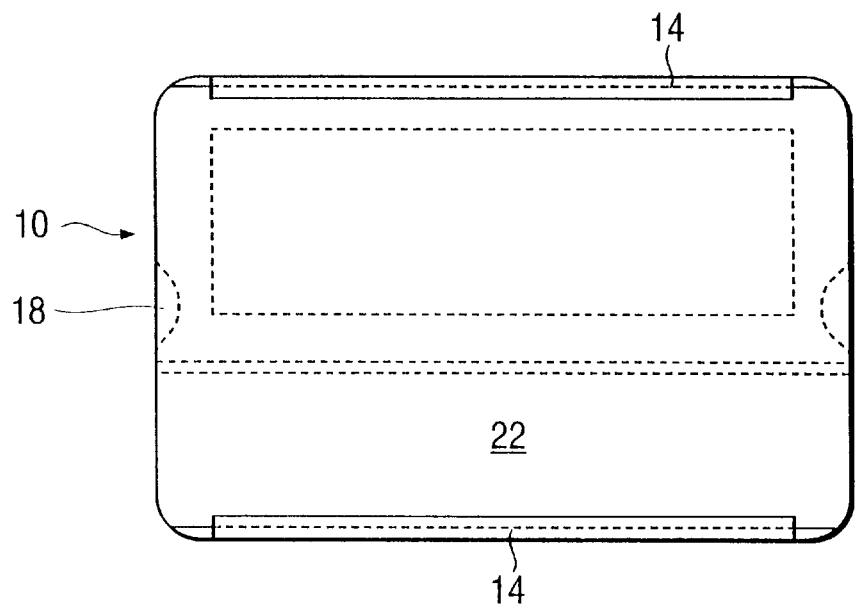
FIG. 5 is a top view of a standardized card slipped in the fresnel magnifying lens card holder according to the example in FIG. 1.

While this invention has been specifically described with respect to the example given in FIGS. 1–5, modification(s) may be made as to the size, shape and location of the fresnel magnifying lens to accommodate other objects, for example, such as may be desirably added onto the base plate. The means for the holder to secure the cards onto its surface, namely, the tracks, may be integrally formed with the base plate or can be separate parts made from the same material or different material to that of the base plate and which are added to the base plate to serve the same function. Similarly the raised strip or, when desirable, plural strips could be integrally formed with the base plate or can be provided as separately disposed part(s) on the base plate and made with different material or from the same material as that of the base plate.

It will be apparent to those skilled in the art that the above-described embodiment and variations thereof are to be considered as examples only of practicing the present invention, that is, other embodiments applicable to the present invention will be apparent to those skilled in the art from consideration of the specification and practice of the invention disclosed herein.

I claim:

1. A fresnel magnifying lens card holder comprising:
   a fresnel lens on a base plate with dimensions approximating a standardized card carried by a person; and
   means which allows the holder to slip onto, securely hold and release the card, said means including (i) a pair of parallel grooved tracks each of which is provided at an edge location of a first pair of opposing rectangular edges of said base plate, and (ii) a raised narrow strip on said base plate.

2. The fresnel magnifying lens card holder according to claim 1, wherein said means is disposed such that the base plate can hold the standardized card snugly irrespective of whether the holder is held with the raised strip facing upwardly or downwardly.

3. The fresnel magnifying lens card holder according to claim 1, wherein the size, shape and position of the fresnel magnifying lens is determined on the basis of the level of viewing desired as limited by the available surface area of the holder for viewing.

4. The fresnel magnifying lens card holder according to claim 1, wherein the base plate is made of plastic, metal or a composite material.

5. The fresnel magnifying lens card holder according to claim 1, wherein the grooved tracks are positioned to run along the longitudinal edges of a rectangular base plate, said tracks being an integral part of the base plate.

6. The fresnel magnifying lens card holder according to claim 1, wherein the grooved tracks are separate parts disposed on the holder and are made with the same material as or different material from that of the base plate.

7. The fresnel magnifying lens card holder according to claim 1, wherein the raised strip runs substantially parallel to the grooved tracks on the front surface of the base plate, said strip being an integral part of the base plate.

8. The fresnel magnifying lens card holder according to claim 1, wherein the raised strip is a separately disposed part on the holder and is made with the same material as or different material from the base plate.

9. The fresnel magnifying lens card holder according to claim 1, wherein the holder has two semi-circular cutaways on a second pair of opposing edges of said base plate which facilitates easy removal of the held card from the holder, in either direction.

10. The fresnel magnifying lens card holder according to claim 1, wherein the grooved tracks are J-shaped, respectively.

11. A fresnel magnifying lens card holder comprising:
    a base plate with dimensions approximating that of a standardized card carried by a person, having a part thereof on which a fresnel lens is provided;
    a pair of parallel grooved tracks each of which is provided at an edge location of a first pair of opposing rectangular edges of said base plate in a manner which allows the card holder to slip into, hold and release a standardized card; and
    a raised narrow strip on said base plate disposed in a manner which results in the holding of a standardized card snugly and which prevents information holding portions of said standardize card from rubbing on the surface of the card holder.

12. The fresnel magnifying lens card holder according to claim 11, wherein said grooved tracks and narrow strip are disposed such that the base plate can hold the standardized card snugly irrespective of whether the holder is held with the raised strip facing upwardly or downwardly.

13. The fresnel magnifying lens card holder according to claim 11, wherein the size, shape and position of the fresnel magnifying lens is determined on the basis of the level of viewing desired as limited by the available surface area of the holder for viewing.

14. The fresnel magnifying lens card holder according to claim 11, wherein the base plate is made of plastic, metal or a composite material.

15. The fresnel magnifying lens card holder according to claim 11, wherein the grooved tracks are positioned to run along the longitudinal edges of a rectangular base plate, said tracks being an integral part of the base plate.

16. The fresnel magnifying lens card holder according to claim 11, wherein the grooved tracks are separate parts disposed on the holder and are made with the same material as or different material from that of the base plate.

17. The fresnel magnifying lens card holder according to claim 11, wherein the raised strip runs substantially parallel to the grooved tracks on the front surface of the base plate, said strip being an integral part of the base plate.

18. The fresnel magnifying lens card holder according to claim 11, wherein the raised strip is a separately disposed part on the holder and is made with the same material as or different material from the base plate.

19. The fresnel magnifying lens card holder according to claim 11, wherein the holder has two semi-circular cutaways on a second pair of opposing edges of said base plate which facilitates easy removal of the held card from the holder, in either direction.

20. The fresnel magnifying lens card holder according to claim 11, wherein the grooved tracks are J-shaped, respectively.

* * * * *